United States Patent [19]

Stocchiero

[11] Patent Number: 5,663,010
[45] Date of Patent: Sep. 2, 1997

[54] DEVICE TO EXHAUST THE FUMES PRODUCED INSIDE ACCUMULATOR BATTERIES

[76] Inventor: Olimpio Stocchiero, via Kennedy 5-36050 Montorso, Vicentino (VI), Italy

[21] Appl. No.: 602,815

[22] PCT Filed: Nov. 25, 1994

[86] PCT No.: PCT/EP94/03907

§ 371 Date: Apr. 23, 1996

§ 102(e) Date: Apr. 23, 1996

[87] PCT Pub. No.: WO95/15585

PCT Pub. Date: Jun. 8, 1995

[30] Foreign Application Priority Data

Nov. 30, 1993 [IT] Italy .................. VI93A0190

[51] Int. Cl.[6] ................................ H01M 2/12
[52] U.S. Cl. ................................ 429/86; 429/89
[58] Field of Search ............ 429/53, 72, 86–89

[56] References Cited

U.S. PATENT DOCUMENTS

| | | | |
|---|---|---|---|
| 1,907,911 | 5/1933 | Wallace et al. | 429/86 X |
| 2,394,333 | 2/1946 | Schneider | 429/86 |
| 3,879,227 | 4/1975 | Hennen . | |
| 4,400,450 | 8/1983 | Wagner | 429/86 |
| 5,209,992 | 5/1993 | Feres | 429/86 |
| 5,298,344 | 3/1994 | Stocchiero | 429/53 |

FOREIGN PATENT DOCUMENTS

| | | |
|---|---|---|
| 0305822 | 3/1989 | European Pat. Off. . |
| 0496539 | 7/1992 | European Pat. Off. . |
| 0514918 | 11/1992 | European Pat. Off. . |
| 2536213 | 5/1984 | France . |
| 9312250 | 10/1993 | Germany . |
| 2015808 | 9/1979 | United Kingdom . |

Primary Examiner—Anthony Skapars
Attorney, Agent, or Firm—Watson Coles Stevens Davis, P.L.L.C.

[57] ABSTRACT

The invention discloses an improved breathing device to exhaust on the outside the fumes produced inside the accumulator batteries. It comprises: at least one chamber (7) realized in the lid (2) of the accumulator battery and communicating on one side with the breathing channels (4) and on the opposite side with the outside environment, provided with one or more through holes (20) communicating with the underlying elements of the accumulator battery. A removable cap (12) inserted in said chamber (7) supports a disc made of an explosion-proof material (11) in front of which a condensing disc (15) is present made of impermeable material suited to define, in relation to the inner perimetral surface (27) of the chamber (7) itself, one or more essentially annular areas (72) for the transit of the fumes.

11 Claims, 2 Drawing Sheets

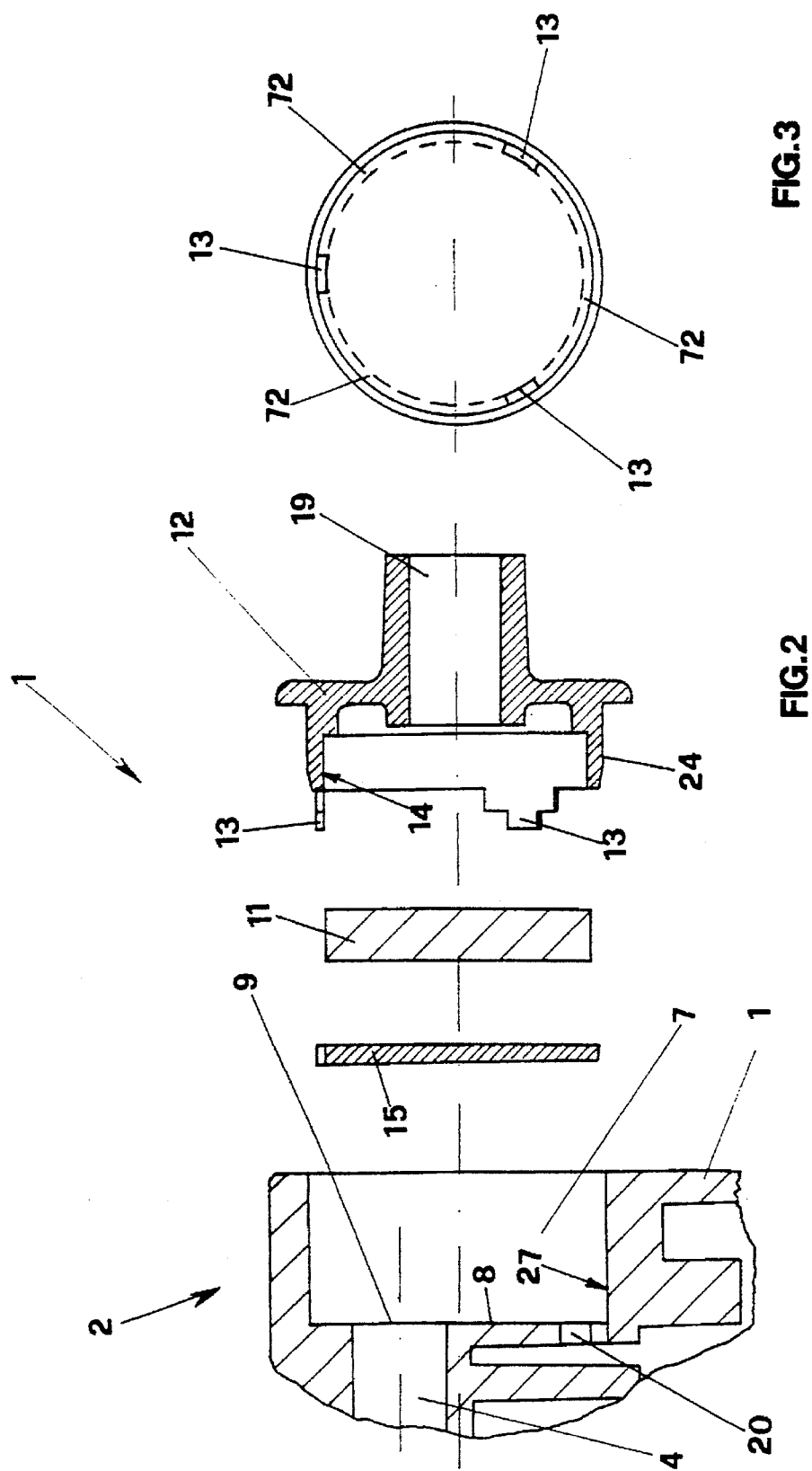

DEVICE TO EXHAUST THE FUMES PRODUCED INSIDE ACCUMULATOR BATTERIES

BACKGROUND OF THE INVENTION

The invention concerns an improved device to exhaust the fumes produced inside accumulator batteries.

It is a known fact that inside accumulator batteries and lead-acid accumulator batteries in particular, fumes are produced while they are in operation and/or are being recharged. Said fumes need to be exhausted from the interior of the accumulator to ambient otherwise they would cause the expansion of the accumulator battery and its eventual breaking.

For this purpose the lids are equipped with breathing channels which join together the topping up holes or filler openings of the accumulator battery formed in the lid (e.g. by drilling) and communicating with the outside environment through outlet holes.

In correspondence with one or more of said outlet holes is attached a connection complete with a flexible tube for the conveyance of the fumes to the outside.

Since the fumes produced inside the accumulator battery contain also hydrogen which is highly explosive, it is necessary in some cases, to apply an explosion-proof device which prevents any possible flames or sparkles present in the environment from penetrating into the accumulator battery through the breathing channels and cause possible explosions because of ignition of the fumes. Such an explosion-proof device consists of a disc of the known type which allows the fumes produced in the accumulator battery to exit and prevents any possible flames or sparkles present on the outside environment from entering into the breathing channels.

In some embodiments such an explosion-proof disc is contained in a receptacle which constitutes an integral part of the connection which is attached to the hole of the breathing channel. In particular, such a disc is positioned between the union element joining the connection to the outlet hole of the breathing channel and the flexible tube which conveys the fumes away from the accumulator battery. In other embodiments according to a known technique, the explosion-proof disc is associated with the lid of the accumulator battery and is positioned inside a chamber in correspondence with the outlet hole of the breathing channels.

In all the mentioned solutions there is the inconvenience that, because the explosion-proof disc is permeable to the fumes but not to the liquids, it clogs whenever the condensate of the electrolyte liquid settles on its surface, being eventually entrained in the form of steam into the breathing channels by the fumes coming out.

It is understood that such an eventuality results in inconveniences and dangers, because the breathing device is compromised and the fumes, which no longer are exhausted, accumulate inside the accumulator battery causing swelling and consequent deformation.

It is with the purpose of eliminating such an inconvenience that the patent for industrial invention No. VI91A000087 in the name of the same inventor is disclosed, said patent describing a breathing device for accumulator batteries which comprises a chamber formed in the lid of the accumulator battery and communicating with the breathing channels on one side and with the outside environment on the opposite side within which is positioned a disc made of an explosion-proof material which is constrained stably in said chamber by the pressure exerted by a removable cap provided with an opening communicating with the exterior. Between said disc and the bottom of said chamber is defined a pre-chamber for the collection of the condensate of the electrolyte steam which communicates with the underlying elements of the accumulator battery by means of one or more through holes which then allow the condensed electrolyte to return into the accumulator battery.

Even such a solution, however, does not totally solve the problem on how to avoid the clogging of the disc, which can in any case occur with the use, above all whenever great amounts of steam develop in the accumulator battery.

In such a case, in fact, there is a higher entrainment of liquid and therefore the disc is more likely to clog.

The present invention proposes to overcome the limitations which the described breathing systems belonging to the known technique present, and has the purpose of obtaining an improved device to exhaust on the outside the fumes produced inside the accumulator batteries which has a higher working reliability as compared with the devices belonging to the known technique.

It is another purpose that the device according to the invention can almost completely avoid the clogging of the breathing disc.

SUMMARY OF THE INVENTION

The described purposes are achieved by an improved breathing device to exhaust on the outside the fumes produced inside the accumulator batteries which, in accordance with the main claim comprises:

- at least one chamber realized in the lid of the accumulator battery and communicating on one side with the breathing channels which join together the topping up holes drilled on the lid itself and communicating on the opposite side with the outside environment, said chamber being provided with one or more through holes communicating with the underlying elements of the accumulator battery;
- a removable cap provided with a central opening passing through and inserted in said chamber;
- a disc made of an explosion-proof material positioned inside said chamber and comprised between the bottom of the chamber itself and said removable cap; is characterized in that within said chamber is present a condensing disc made of impermeable material positioned between said explosion-proof material and the bottom of said chamber and placed at a distance from both of them, said condensing disc having an outer perimetral development which is smaller than the inner perimetral development of the chamber within which it is located defining one or more annular areas for the transit of the fumes.

Advantageously, the improved breathing device according to the invention almost completely eliminates the chances for the explosion-proof disc to clog, thus ensuring the efficiency of the fume breathing system during a considerable length of time.

Advantageously, the condensed electrolyte is prevented from dripping on the outside and once the condensation is completed, it flows back into the accumulator battery.

BRIEF DESCRIPTION OF THE DRAWINGS

Further scope of applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein:

FIG. 2 shows the improved breathing device according to the invention in an exploded view;

FIG. 3 shows the front view of the lid of the breathing device represented in FIG. 2.

DESCRIPTION OF THE INVENTION

Figure 1:
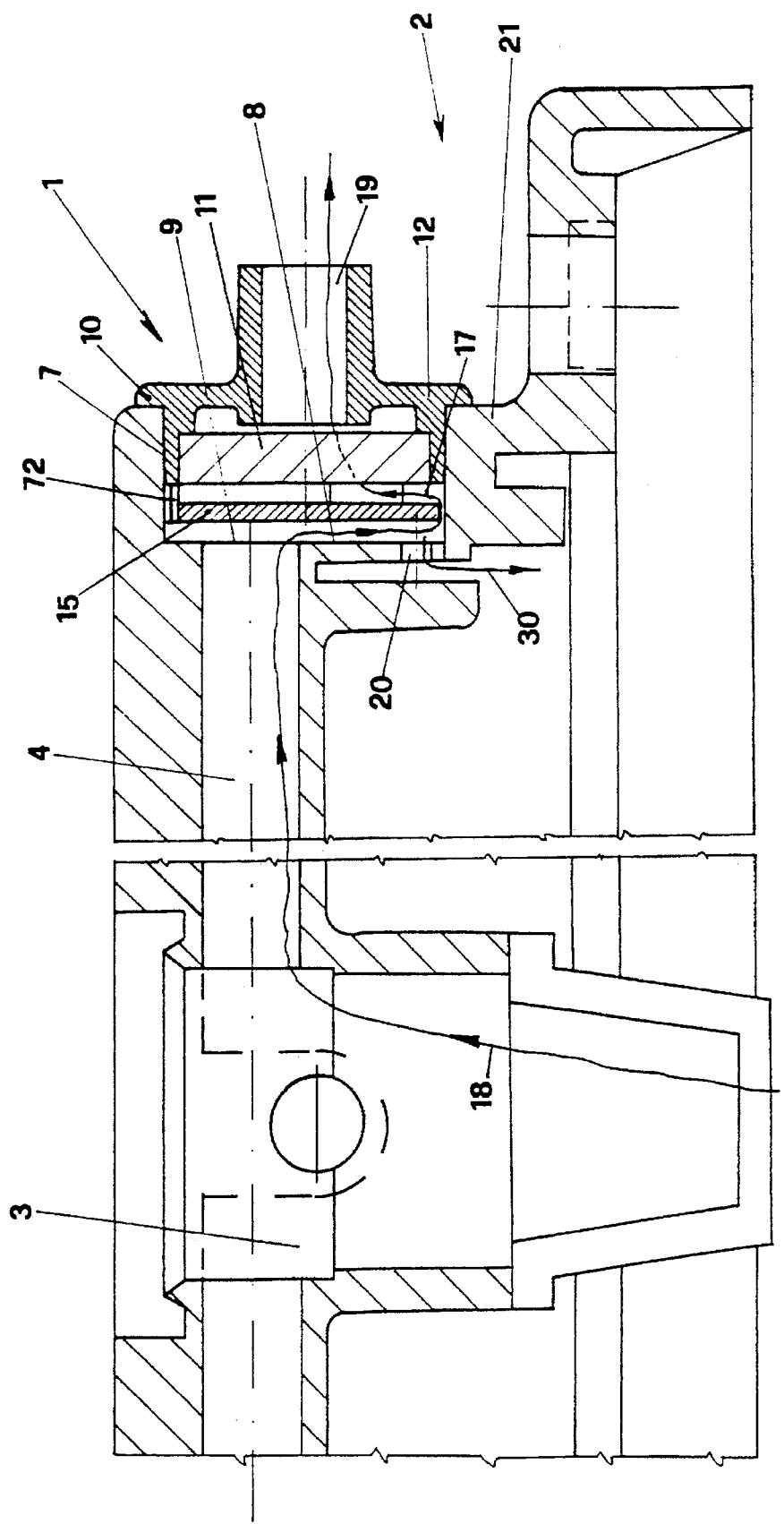
FIG. 1 shows the enlarged representation of a vertical section of a lid of an accumulator battery having a breathing channel within which the improved breathing device according to the invention is applied.

As can be observed in the FIGS. 1 and 2, the improved breathing device, is applied to applied for accumulator batteries, indicated as a whole with 2, which has a plurality of topping up holes joined together by means of a plurality of breathing channels of which FIG. 1 shows one topping up hole 3 and one breathing channel 4.

In correspondence with the lateral wall 21 of the lid and in the area wherein said channels 4 communicate with the outside environment, a cylindrical chamber 7 is formed, as can be observed, the bottom 8 of which communicates with one of the breathing channels 4 through a hole 9.

Inside said chamber 7 is push-fitted a cap 12 which, as can be observed in particular in FIG. 2, has an annular housing 14 for receiving a disc made of an explosion-proof material 11 having a circular shape.

It can also be observed that said cap 12 is equipped with projecting elements 13, a condensing disc 15 made of impermeable material positioned between them.

It is evident that in different embodiments said chamber, said explosion-proof disc and said condensing disc can also have shapes differing from the circular shape.

The cap 12, coupled with the explosion-proof disc 11 and the condensing disc 15, is inserted into the chamber 7 until its shoulder 10 enters into contact against the lateral wall 21 of the lid 2.

It is pointed out that the lateral surface 24 of the cap 12 presents an interference with the lateral surface of the chamber 7 within which said cap is inserted, thus ensuring a tight fit with said cylindrical chamber 7.

Such an interference between the cap 12 and the cylindrical chamber 7 holds back the explosion-proof disc 11 and the condensing disc 15 inside the cylindrical chamber itself with a force so as to contact the inner pressure produced by the fumes which develop inside the accumulator battery. By properly adjusting the value of such an interference it is possible to pre-set the maximum pressure threshold beyond which the cap 12 is ejected from the chamber 7, so that the device according to the invention also acquires the characteristics of a safety valve.

When the cap is fitted inside the chamber 7, as can be observed in FIG. 1, the condensing disc 15 is positioned at a distance in relation to the surface of the explosion-proof disc 11 and has an outer perimeter which is smaller than the perimeter of the transversal section of the chamber 7.

Moreover, since said condensing disc is supported by the projecting elements 13 of the cap 12 to which it is attached, it is positioned at a distance in relation to the inner lateral surface 27 of the chamber 7 itself and thus it defines, in correspondence with its perimetral rim, one or more essentially annular areas 72, visible also in FIG. 3, through which the fumes which are conveyed by the channels 4 pass.

In fact, the fumes produced in the cells of the accumulator battery are conveyed following direction 18 in the channels 4 and then, by passing through said annular areas 72, arrive in correspondence with the explosion-proof disc 11 which crosses until they reach the outside environment through the hole 19 drilled in the lid 12.

Before coming into contact with the explosion-proof disc 11, the breathing fumes encounter the condensing disc 15 which, because it presents a higher density in relation to the fumes, is impermeable in relation to the latter and stops it, condensing it partially.

The liquid of the condensate is collected at the bottom of the chamber 7 and, through one or more holes 20 drilled in the lid 2 in correspondence with the bottom of the chamber 7, it comes back by dripping following direction 30 inside the cells of the accumulator battery.

The part of the fumes which is more volatile and does not condense, resumes its course following direction 17 and after crossing the annular areas 72 arrives in correspondence with the explosion-proof disc 11, it passes through it and exhausts on the outside through opening 19.

The presence of such a condensing disc 15 is therefore very important since it prevents a possible condensate of the exhaust fumes from sedimenting in the explosion-proof disc 11.

It, therefore, ensures that the explosion-proof disc can keep its entire efficiency for a long time. Moreover, eventual condensed liquid in correspondence with the condensing disc 15 falls again inside the elements of the accumulator battery thus avoiding drippings on the outside.

As has been said, in case of overpressure, the cap 12 which supports the explosion-proof disc 11 and the condensing disc 15, act as a safety valve which entirely opens the flow of the fumes of the channels 4 towards the exterior through opening 19, whenever the inner pressure of the accumulator battery exceeds the forcing value between the lateral surface 24 of the cap 12 and the corresponding inner lateral surface 27 of the chamber 7.

Obviously, one or more of the described devices can be applied to the lid of the accumulator battery, i.e. one of said devices can be positioned in correspondence with each breathing channel realized in the lid.

Moreover, during the manufacturing process the device according to the invention may undergo manufacturing variations with the purpose of improving its working or simplifying its manufacturing process. However, it is to be understood that all said possible variations must fall within the spirit and scope of the present invention.

I claim:

1. A device for exhausting fumes formed within the lid of an accumulator comprising:

a chamber formed in the accumulator lid having inlet opening and an outlet opening, said lid having an exhaust duct in communication with one side of the chamber through the inlet opening and on the opposite side of the chamber communicating with the outside environment through the outlet opening;

a removable cap having a central through opening located in the outlet opening of the chamber, including an annular support having a free marginal edge extending into the chamber and projecting elements extending inwardly of the chamber from the free marginal edge of said annular support;

a gas permeable explosion-proof disc located in the annular support; and a condensing disc located in the chamber in spaced relation with the explosion-proof disc, said condensing disc having a diameter smaller than the annular support forming an annular space therebetween and having an edge portion for engaging the projecting elements for supporting the condensing disc in said spaced relation and being in communication with the exhaust duct forming a pre-chamber between the condensing disc and the inlet opening, said pre-chamber for collecting condensed electrolyte vapors from the accumulator and said annular space allowing gas to pass to the explosion-proof disc for passage therethrough.

2. A device according to claim 1 wherein said pre-chamber is formed with a drain hole formed in a wall portion below the inlet opening, said drain hole being located remote from the inlet and in direct serial flow communication with the interior of the accumulator from the pre-chamber for returning vapor condensate thereto without back flow of said condensate through the inlet.

3. A device according to claim 1 wherein the removable cap is inserted in the chamber for interference fit in the opening.

4. A device according to claim 1 wherein the chamber is formed in a lateral wall of the lid.

5. A device according to claim 4 wherein the chamber is located centrally in the lateral wall of the lid.

6. A device according to claim 1 wherein the projecting element comprises a plurality of spacer portions each extending from the annular support and a tab forming a free end of the spacer.

7. A device according to claim 6 wherein the edge portion of the condensing disc has a plurality of notch portions formed therein each corresponding to one of the projecting elements engaging the condensing disc for securing said condensing disc to the cap.

8. A device according to claim 1 wherein said cap, explosion-proof disc and condensing disc are coaxially connected with one another.

9. A device according to claim 1 wherein the annular support of said cap fits with interference with a corresponding surface of the chamber.

10. A device according to claim 1 wherein said chamber is formed in a lateral wall of said lid.

11. A device for exhausting fumes formed within the lid of an accumulator comprising:

a chamber formed in the accumulator lid having inlet opening and an outlet opening and said lid having an exhaust duct in communication with one side of the chamber through the inlet opening and on the opposite side of the chamber, communicating with the outside environment through the outlet opening;

a removable cap having a central through opening located in the outlet opening of the chamber, including an annular support extending into the chamber and projecting elements extending inwardly of the chamber from said annular support;

a gas permeable explosion-proof disc located in the annular support;

a condensing disc located in the chamber in spaced relation with the explosion-proof disc, said condensing disc having a diameter smaller than the annular support forming an annular space therebetween and having an edge potion for engaging the projecting elements for supposing the condensing disc in said spaced relation and being in communication with the exhaust duct forming a pre-chamber between the condensing disc and the inlet opening, said pre-chamber for collecting condensed electrolyte vapors from the accumulator and said annular space allowing gas to pass to the explosion-proof disc for passage therethrough to atmosphere; and said pre-chamber having a drain hole formed in a wall portion below the inlet opening, said drain hole being located remote from the inlet and in direct serial flow communication with the interior of the accumulator from the pre-chamber for returning vapor condensate thereto without back flow of said condensate through the inlet.

* * * * *